UNITED STATES PATENT OFFICE.

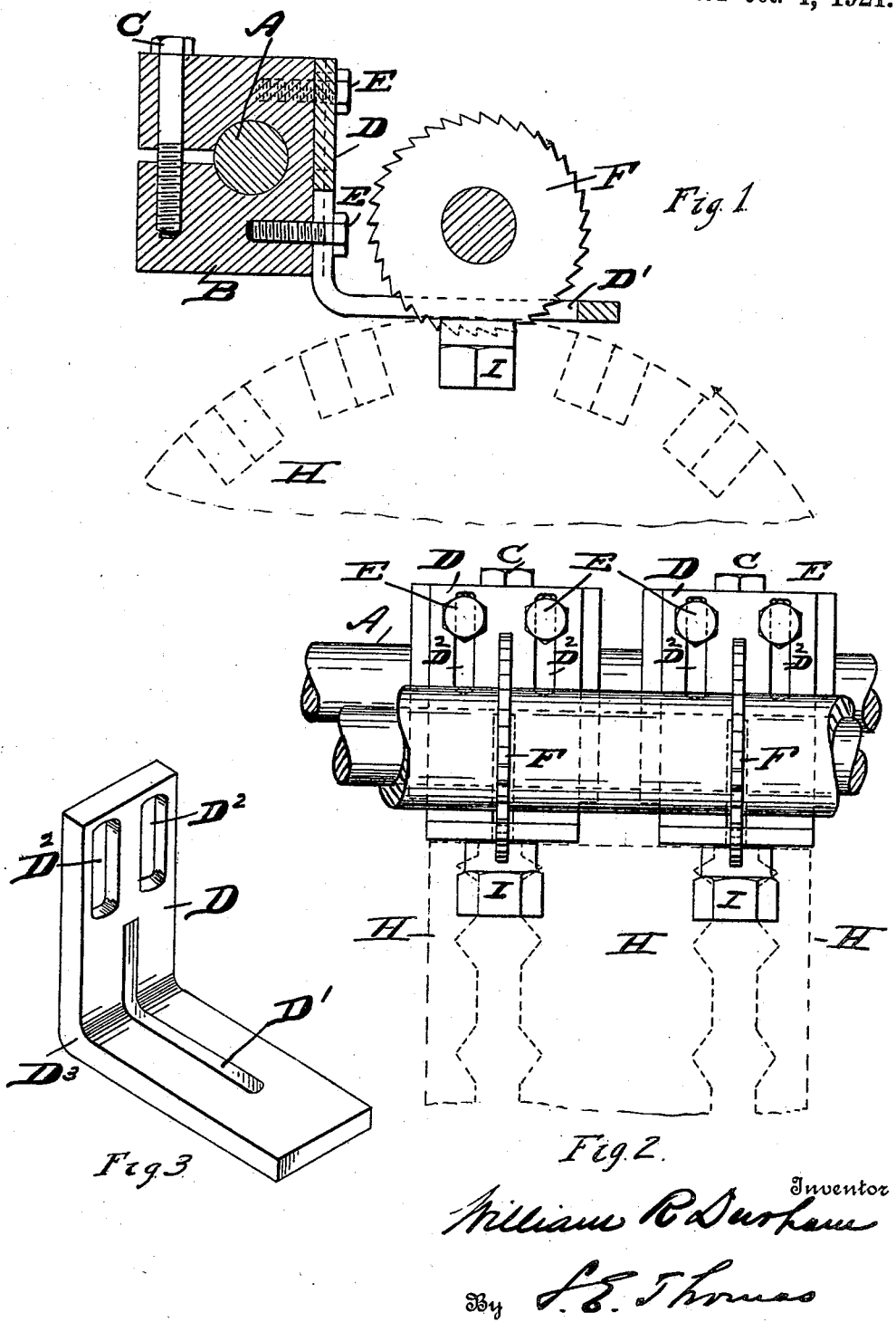

WILLIAM R. DURHAM, OF DETROIT, MICHIGAN.

NUT-KEEPER FOR MILLING-MACHINES.

1,392,681.  Specification of Letters Patent.  Patented Oct. 4, 1921.

Application filed November 22, 1920. Serial No. 425,686.

*To all whom it may concern:*

Be it known that I, WILLIAM R. DURHAM, citizen of the United States, residing at Detroit, county of Wayne, State of Michigan, have invented a certain new and useful Improvement in Nut-Keepers for Milling-Machines, and declare the following to be a full, clear, and exact description of the same, such as will enable others skilled in the art to which it pertains to make and use the same, reference being had to the accompanying drawings, which form a part of this specification.

My invention relates to a castellated nut-keeper for milling machines, shown in the accompanying drawings and more particularly described in the following specification and claims.

It is well known that in cutting the kerf in castellated nuts the saw has a tendency to withdraw the nuts from the pockets formed by the recesses in the opposing rotatable holding plates of the milling machine which carry the nuts to the saw.

It is therefore the object of my invention to provide an attachment for milling machines adapted to prevent the withdrawal of the nuts from the rotatable holding plates while being acted upon by the saw.

With the foregoing and other objects in view which will appear as the description proceeds the invention further resides in the details of construction hereinafter described and claimed, it being understood that changes may be made in the precise embodiment of the invention herein disclosed without departing from the spirit of the same.

In the drawings accompanying this specification and forming part thereof:

Figure 1 is a cross sectional view through the keeper attached to a clamping member secured to a fixed shaft forming part of the milling machine construction,—showing also the saw, and in dotted lines one of the rotatable recessed plates for carrying the nuts to the saw.

Fig. 2 is a front elevation of a detail showing a pair of keepers with their respective saws, and in dotted lines the opposing rotatable recessed plates for carrying the nuts to the saws.

Fig. 3 is a perspective view of the keeper.

Referring now to the letters of reference placed upon the drawings:

A is a fixed shaft forming part of a milling machine of usual construction,

B, is a divided block clamped to the shaft by a bolt C.

D, is a nut-keeper secured to the block B by bolts E. H, H, are rotatable opposing recessed plates adapted to receive and carry the nuts I, to the saw F.

The keeper D is slotted as indicated at D' to receive the saw. It is also slotted as indicated at $D^2$ to receive the bolts E by which it is secured to the clamping block B.

By providing slotted openings for the bolts the device may be readily adjusted to meet the requirements of the work. The keeper is preferably given a spring-temper at $D^3$ to overcome slight variations in height of the nuts.

When the milling machine is in operation the recessed plates rotate in the direction indicated by the arrow and the nuts are placed by an attendant in the recesses of the opposing plates,—the recesses being adapted to receive and loosely grip the sides of the nut. The nuts before reaching the saw pass under the keeper D which prevents their withdrawal from the rotatable plates through the lifting action of the saw.

Having thus described my invention what I claim is:

1. In a milling machine, a saw, opposing rotatable plates arranged in pairs and recessed to form pockets to receive a plurality of nuts for delivery to the saw, and an adjustable keeper adapted to overlap the nuts as they are fed to the saw, whereby when acted upon by the latter they are held against withdrawal from the pockets formed by the opposing rotatable plates.

2. In a milling machine, a saw, rotatable opposing plates having recesses which together form a plurality of pockets to receive a plurality of nuts for delivery to the saw, a keeper comprising a right-angle member slotted for the passage of the saw, said keeper being adapted to overlap the nuts as they are delivered to the saw, whereby the nuts are held against withdrawal from the pockets by the operation of the saw, and bolts extending through slots in said keeper for adjustably securing the keeper to a fixed member of the milling machine.

3. In a milling machine, a saw, means for delivering a plurality of nuts to the saw whereby grooves may be cut therein, a keeper secured to a fixed member of the machine, having a resilient right-angle portion adapted to overlap the nuts as they are fed to the saw, whereby the overlapping portion of the keeper may adjust itself to variations in the thickness of the nut and whereby the nut may be held against withdrawal from the means for delivering the nut to the saw, due to the action of the latter.

In testimony whereof, I sign this specification in the presence of two witnesses.

WILLIAM R. DURHAM.

Witnesses:
S. E. THOMAS,
JOHN CONSIDINE, Jr.